United States Patent [19]

Tilley

[11] 4,343,774
[45] Aug. 10, 1982

[54] METHOD FOR RECOVERING VALUABLE METALS FROM DEACTIVATED CATALYSTS

[75] Inventor: George L. Tilley, Newport Beach, Calif.

[73] Assignee: Union Oil Company of California, Los Angeles, Calif.

[21] Appl. No.: 67,661

[22] Filed: Aug. 20, 1979

[51] Int. Cl.³ .................... C01G 51/10; C01G 53/10; C01G 39/00; C01G 31/00

[52] U.S. Cl. ..................................... 423/53; 423/54; 423/150

[58] Field of Search ................ 423/53, 54, 150; 252/413

[56] References Cited

U.S. PATENT DOCUMENTS

| | | | |
|---|---|---|---|
| 1,779,841 | 10/1930 | Fischer | 423/109 |
| 3,256,205 | 6/1966 | Constabaris | 252/413 |
| 3,367,740 | 2/1968 | Zubryckyj | 423/150 |
| 3,567,433 | 3/1971 | Gutnikov | 423/150 |
| 3,578,395 | 5/1971 | Kluksdahl | 423/49 |
| 4,145,397 | 3/1979 | Toida | 423/54 |
| 4,192,851 | 3/1980 | Hirsch | 423/53 |

*Primary Examiner*—Brian E. Hearn
*Attorney, Agent, or Firm*—Gregory F. Wirzbicki; Dean Sandford

[57] ABSTRACT

Cobalt is recovered in substantial amounts from spent catalyst particles comprising cobalt components supported on alumina or other aluminum-containing refractory oxides. The process comprises contacting the catalyst with sulfuric acid, then subjecting the catalyst to oxidation in an oxygen-containing atmosphere under conditions of elevated temperature, and again contacting the catalyst with sulfuric acid to extract cobalt. Molybdenum, if present on the catalyst, is recovered with the cobalt, as are other metals, such as nickel and tungsten.

20 Claims, No Drawings

METHOD FOR RECOVERING VALUABLE METALS FROM DEACTIVATED CATALYSTS

BACKGROUND OF THE INVENTION

This invention relates to a process for recovering valuable metals from spent catalysts and is especially directed to recovering cobalt from spent catalysts containing cobalt components intimately admixed or supported on aluminum-containing refractory oxides. In particular, the extraction process of the present invention is applicable to spent hydroprocessing catalysts, that is, catalysts utilized in particulate form and under conditions of elevated temperature and pressure and in the presence of hydrogen to convert a hydrocarbon liquid to more valuable products.

Typically, cobalt-containing hydroprocessing catalysts are employed in the petroleum industry for hydrogenation, hydrotreating, hydrodesulfurization, hydrodenitrogenation, hydrocracking, and hydrofinishing. Usually, cobalt-containing catalysts used in the foregoing processes also contain molybdenum components, and both the cobalt and the molybdenum components are largely present as sulfides intimately composited with a refractory oxide such as alumina. The proportion of cobalt components (as CoO) in such catalysts is between 2 and 20 weight percent and the proportion of molybdenum components (as $MoO_3$) is usually between 8 and 35 weight percent.

It can be seen that, when spent, the typical hydroprocessing catalyst provides a relatively rich source of cobalt or cobalt and molybdenum. At present-day prices of $20.00 per pound for cobalt and $7.00 per pound for molybdenum, there is a strong incentive to recover as much of these metals as possible from the spent catalyst particles.

One method by which the active metal in a catalyst may be recovered is by total digestion, i.e., by dissolving the catalyst in hot, concentrated sulfuric acid. Although this method has the obvious advantage of recovering 100% of the available metals, it also has disadvantages. The amount of acid necessary for total digestion is prohibitive from an economic standpoint, and the resulting solution contains far more dissolved aluminum than active metals, making separation of the valuable active metals from the relatively inexpensive aluminum a difficult problem.

Accordingly, it is an object of the invention to provide a process for recovering cobalt or cobalt and molybdenum in substantial proportions from a catalyst also containing an aluminum-containing refractory oxide. It is a further object to recover such metals by liquid extraction, and to extract far less aluminum than active metals, thereby simplifying recovery of the active metals from the leachate. These and other objects and advantages will be apparent from the following description of the invention.

SUMMARY OF THE INVENTION

Briefly, the present invention is a process for recovering a high proportion of cobalt from spent catalyst particles containing one or more cobalt components intimately composited with an aluminum-containing refractory oxide. If the spent catalyst also contains molybdenum components, the process of the invention recovers a high proportion of both cobalt and molybdenum. In accordance with the invention, the spent catalyst is first contacted with sulfuric acid so as to wet a substantial proportion of the surface thereof, following which the catalyst is subjected to elevated temperatures and an oxidizing atmosphere comprising oxygen. After the oxidation treatment, the catalyst is contacted with an aqueous leaching solution, such as a dilute sulfuric acid solution, under conditions sufficient to extract a substantial proportion of the cobalt from the catalyst into the leaching solution, which is separated as a product or leachate from the catalyst particles by conventional solids-liquid separation techniques. The weight ratio of cobalt to aluminum in the leachate is substantially higher than the weight ratio of cobalt to aluminum in the catalyst.

DETAILED DESCRIPTION OF THE INVENTION

Spent catalysts suitable for treatment herein contain a cobalt component in intimate admixture or intimately composited with an aluminum-containing refractory oxide. Typically, the spent catalyst comprises one or more cobalt oxides or sulfides supported on a porous refractory oxide selected from the group consisting of alumina, silica-alumina, amorphous or crystalline aluminosilicates, or combinations thereof. Molybdenum generally is also present in the catalyst, usually as an oxide or sulfide, but also as a compound of cobalt and molybdenum such as cobalt molybdate, which often is present as an active component in an alumina-supported catalyst for hydrodesulfurizing heavy hydrocarbon fractions or for converting sulfur components to $H_2S$ by hydrogenation and/or hydrolysis as described in U.S. Pat. No. 3,752,877. Preferred spent catalysts treated herein contain 2 to 20 weight percent cobalt components (calcualted as CoO), 8 to 35 weight percent molybdenum components (calculated as $MoO_3$), and the balance consisting essentially of alumina. The most preferred spent catalyst for treatment herein comprises 3 to 8 weight percent cobalt components (calculated as CoO), 12 to 25 weight percent molybdenum components (calculated as $MoO_3$), and the balance consisting essentially of alumina.

The most preferred catalyst for treatment herein is a spent hydroprocessing catalyst, especially when the cobalt or cobalt plus molybdenum components are present largely in the form of sulfides. One indication that the catalyst metals are in the sulfide form is the presence of coke on the catalyst surfaces. During hydroprocessing operations, combustible materials termed coke deposit on the surfaces of the catalyst particles, usually in an amount between 0.01 and 0.15 times the weight of the catalyst. Since the cobalt and molybdenum components would be converted to the oxide form if the coke were combusted off the catalyst, the presence of coke on the catalyst is an indication that the active metals are still present in the sulfide form.

In the first step of the process, the coked hydroprocessing catalyst or other catalyst to be treated for recovery of metals is contacted with sulfuric acid. The sulfuric acid may be highly concentrated or diluted in an aqueous media. In general, aqueous solutions containing more than about 3 percent sulfuric acid are suitable, but concentrated sulfuric acid is preferred. The contacting of spent catalyst particles and sulfuric acid may be accomplished in as convenient a manner ad desired, as by immersion of the catalyst particles in an acid bath. Usually, the contacting is accomplished under conditions such that the catalyst surfaces are at least wetted with the acid. More preferably, for catalysts comprising a porous refractory oxide support, the contacting is such that a substantial percentage of the pore volume available to liquid saturation is occupied with sulfuric acid. Most preferably, of course, the sulfuric acid fully occupies the pores of the catalyst.

In the second step of the process, the catalyst particles are subjected to elevated temperatures and an oxidizing atmosphere containing oxygen, preferably air. The time of exposure should be correlated with the temperature such that the catalyst particles are dried and a substantial proportion of the cobalt and molybdenum components are converted to a form soluble in the aqueous leaching solution hereinafter described. For coked catalysts, it is highly preferred that the exposure to the oxidizing atmosphere be conducted under conditions such that the coke is combusted off the catalyst particles. Generally, temperatures above about 900° F., preferably above about 1000° F., are required to remove the coke deposits. Spent catalyst particles containing little or no coke may be treated under less severe temperature conditions, with suitable results being obtained at temperatures of 300° F. or above. Preferably, however, temperatures of 500° F. or more should be used.

It is a critical feature of the invention that the catalyst first be contacted by sulfuric acid and then subjected to an oxidizing atmosphere, rather than vice-versa. It has been found that, if the catalyst particles are subjected to oxidation, as by roasting, prior to contact with sulfuric acid, the amount of cobalt ultimately recovered in the leaching step to be described hereinafter is reduced roughly by half. This undesirable result is theorized to be due to the migration of cobalt into the alumina lattice and/or the formation of cobalt aluminates that are difficult to extract. The method of the invention, however, is believed to prevent both the migration of cobalt and the formation of aluminates by converting the cobalt components in the oxidation step to cobalt sulfates, which remain on the surface of the catalyst particles and are relatively easy to extract in aqueous media. (The foregoing theory is presented as an explanation of the superior results obtained in the invention. The invention, however, is not to be limited by this theory, the scope of the invention being defined by the claims.)

In the third step of the process, the spent catalyst particles are contacted with an aqueous liquid under conditions such that a substantial proportion of the cobalt, or cobalt and molybdenum if the catalyst contains molybdenum, are leached into the aqueous liquid. The preferred aqueous leaching solution is sulfuric acid, and in one embodiment of the invention, a sulfuric acid solution of the same concentration as that utilized in the first step of the process is utilized. With sulfuric acid utilized in concentrations between about 3 percent and 10 percent by weight, the leaching of cobalt and molybdenum from the spent catalyst particles may be accomplished under ambient conditions and with a weight of catalyst to weight of sulfuric acid ratio between about 2:1 and about 10:1, preferably between 4:1 and 6:1. Residence times vary with the spent catalyst being treated but generally are in the range of 0.25-2 hours.

One unusual and highly beneficial feature of the invention is that relatively little aluminum is recovered with the cobalt and molybdenum. In the usual case, the amount of cobalt recovered from the catalyst is more than 50% of that available in the catalyst whereas the amount of aluminum recovered is less than 25%, usually less than 20%, of that available in the catalyst. In other words, the weight ratio of cobalt to aluminum in the leachate is substantially higher than the weight ratio or cobalt to aluminum in the catalyst particles.

The recovered leachate containing dissolved cobalt and molybdenum may be treated by conventional methods for recovering metals from aqueous solutions. For example, the molybdenum may first be separated by adjusting the pH (if necessary) of the leachate to 3.0 or above and then contacting the leachate with an ion exchange resin or solvent ion exchange agent having tertiary or quarternary amine functionality. The molybdenum-free leachate may then be treated by solvent ion exchange or fixed bed ion exchange to separate the cobalt from the aluminum. Alternatively, the cobalt is recovered by precipitating the cobalt as a sulfide. Of most importance, however, is the fact that, regardless of which recovery method is chosen, the presence of aluminum in the leachate in relatively low proportions makes the recovery of the cobalt from the leachate less difficult than if the cobalt had been recovered by total digestion of the catalyst particles.

The following example comparing the three-step process of the invention to a one-step extraction procedure using sulfuric acid and two-step procedures wherein the catalyst particles are first subjected to oxidation conditions and then contacted with sulfuric acid is provided to illustrate the performance of the invention, not to limit its scope, which is defined by the claims.

COMPARATIVE EXAMPLE

In order to demonstrate the effectiveness of the method of the invention, an experiment following the procedure of the invention was performed to recover cobalt and molybdenum from spent hydrodesulfurization catalyst particles consisting essentially of 4.3 percent by weight of cobalt (calculated as CoO), 12.2 percent by weight molybdenum (calculated as $MoO_3$), and the balance gamma alumina, a porous refractory oxide. The catalyst particles were in the sulfided state and contained 7.17 percent by weight sulfur and further contained coke on the surfaces thereof in an amount equal to 0.123 times the catalyst weight. The procedure employed in the experiment was as follows:

Step (1) Fifty grams of catalyst particles were introduced into a flask, and dilute sulfuric acid (5.4 percent by weight) was slowly introduced into the flask and swirled. Addition of acid was continued with swirling until the catalyst particles began to stick to the sides of the flask. At this point, the catalyst particles were completely pore saturated, and essentially no drainable sulfuric acid was left in the flask.

Step (2) The saturated catalyst from step (1) was placed in a sagger and introduced into a laboratory-sized furnace and subjected to a temperature of 1000° F. for 1 hour in the presence of air. At the end of the hour, the calcined catalyst was recovered, and no coke was visible on the surfaces thereof.

Step (3) The oxidized catalyst from step (2) was introduced into a three neck flask and stirred for 1 hour with a 5.4 weight percent sulfuric acid solution, the liquid acid being present in the flask in a ratio to the catalyst of 0.22 gm. $H_2SO_4$ to 1 gm. of catalyst. (Thus, for each gram of catalyst, 4.07 gram of the 5.4 percent dilute acid was utilized.) After the catalyst and acid were stirred together for 1 hour, the catalyst particles were separated by filtration from the acid containing the leached metals. The catalyst was washed with distilled water, and the wash liquid was collected and mixed with the leachate. After the dissolved cobalt, molybdenum, and aluminum contents of the leachate-wash water mixture were determined by appropriate analytical methods, the percentage removals of these metals from the catalyst were calculated and tabulated in Table I.

For purposes of comparison, three more fifty gram samples of the same catalyst used in the preceding experiment were taken, and one was subjected to only step (3) as described above, another to step (2) followed by (3), and the third to step (2) followed by (3) using in step (3) a 10 percent acid solution in a ratio of 2.0 gm. $H_2SO_4$ to 1.0 gm. of catalyst particles. The leachate-wash water mixtures in these experiments were subjected to metals analysis, and the results following appropriate calculations were tabulated in Table I.

TABLE I

| Procedure | Metals Removed as Percentage of that Contained in the Catalyst | | |
|---|---|---|---|
| | Co | Mo | Al |
| Steps (1), (2), and (3) | 70 | 64 | 15 |
| Step (3) alone | 4 | <1 | 12 |
| Steps (2) and (3) | 39 | 59 | 8 |
| Steps (2) and (3) with increased acid | 64 | 84 | 45 |

As shown, the data clearly indicate that the method of the invention is unexpectedly superior to the other three methods. The method of step (3) removed virtually no metals, and the method of step (2) followed by (3) removed only half as much cobalt as in the invention, perhaps for the theory already expressed that initially subjecting the catalyst to an oxidation atmosphere at elevated temperatures either drives the cobalt into inaccessible locations in the catalyst or forms higly stable compounds resistant to the leaching effects of sulfuric acid. The methods of steps (2) and (3) using increased acid showed that for this method to remove an equivalent amount of cobalt as in the invention three times as much aluminum is removed. Thus, the method of the invention is an improvement over this third method in that the invention proves highly selective for removing valuable cobalt and molybdenum metals from a catalyst comprising alumina in a major proportion.

Although the invention has been described with reference to a comparison example, many variations, modifications, and alternatives of the invention as described will be apparent to those skilled in the art. For example, other Group VIB and VIII metals besides cobalt and molybdenum may be present in the catalyst, particularly nickel and tungsten, and the method of the invention is useful for removing substantial amounts of such metals along with the cobalt or cobalt and molybdenum. Also, if the spent catalyst contains deposited vanadium components, as often happens during hydrodesulfurization for example, the leachate will also contain substantial proportions of dissolved vanadium, a valuable metal. Accordingly, it is intended to embrace within the invention these and all such variations, modifications, and alternatives as fall within the spirit and scope of the appended claims.

I claim:

1. A process for recovering valuable metals from spent catalyst particles comprising cobalt components intimately composited with a substantial amount of an aluminum-containing refractory oxide, which process comprises:

(1) contacting the catalyst particles with an aqueous sulfuric acid solution,
   (2) subsequently subjecting the catalyst particles to conditions of elevated temperature in an oxidizing atmosphere comprising oxygen, and
   (3) again contacting the catalyst particles with an aqueous, liquid leaching solution under conditions such that cobalt is extracted into said solution.

2. A process as defined in claim 1 wherein said spent catalyst particles also contain molybdenum, a substantial proportion of which is extracted in step (3) with cobalt into said aqueous leaching solution.

3. The process as defined in claim 1 wherein said catalyst particles contain, besides cobalt, one or more metals selected from the group consisting of the Group VIB and VIII metals, a substantial proportion of which are extracted in step (3) with cobalt into said aqueous leaching solution.

4. A process as defined in claim 1 wherein said spent catalyst particles contain, besides cobalt, at least one metal selected from the group consisting of tungsten and nickel, a substantial proportion of which tungsten or nickel is leached in step (3) with cobalt into said aqueous leaching solution.

5. A process as defined in claim 1 wherein cobalt is extracted in step (3) in a weight ratio to aluminum substantially higher than the weight ratio of cobalt to aluminum in the catalyst.

6. A process as defined in claim 1, 2, or 5 wherein the oxidation in step (2) is accomplished in the presence of air at a temperature above about 900° F.

7. A process as defined in claim 1, 2, or 5 wherein said catalyst contains one or more deposited vanadium components thereon, and a substantial proportion of said vanadium is leached in step (3) into said aqueous leaching solution.

8. A process for recovering valuable metals from spent catalyst particles comprising cobalt components intimately composited with a substantial amount of porous refractory oxide selected from the group consisting of alumina, silica-alumina, and amorphous and crystalline aluminosilicates, which process comprises (1) contacting the catalyst particles with an aqueous sulfuric acid solution under conditions such that a substantial proportion of the total pore volume of the catalyst is filled with acid,
   (2) subsequently subjecting the catalyst particles to a temperature of at least 500° F. in the presence of an oxidizing atmosphere comprising oxygen, and
   (3) again contacting the catalyst particles with an aqueous sulfuric acid solution so as to extract cobalt therefrom and produce a leachate containing cobalt in dissolved form.

9. A process as defined in claim 8 wherein said spent catalyst particles also contain molybdenum, a substantial proportion of which is extracted in step (3) into said sulfuric acid solution.

10. A process for recovering valuable metals from spent hydroprocessing catalyst particles comprising cobalt and molybdenum components composited with a substantial amount of gamma alumina, said catalyst particles containing coke on the surfaces thereof, which process comprises (1) contacting the catalyst particles with an aqueous sulfuric acid solution,
   (2) subsequently subjecting the catalyst particles to conditions of elevated temperature and an oxygen-containing oxidizing atmosphere such that essentially all the coke on the catalyst is removed therefrom, and (3) contacting the catalyst with an aqueous solution of sulfuric acid under conditions such that substantial amounts of cobalt and molybdenum are extracted from the catalyst particles into said sulfuric acid solution, thereby producing a leachate containing dissolved cobalt and molybdenum.

11. A process as defined in claim 8 or 10 wherein said sulfuric acid solution in step (1) is of essentially the same concentration as that in step (3).

12. A process as defined in claim 8 or 10 wherein said sulfuric acid solution in step (1) is contacted with the catalyst for a time period sufficient to fill a substantial proportion of the available pore volume of the catalyst particles with acid.

13. A process as defined in claim 8 or 10 wherein the oxidation in step (2) is accomplished in the presence of air.

14. A process as defined in claim 8, 9, or 10 wherein said leachate contains cobalt in a weight ratio to aluminum that is substantially higher than that of the spent catalyst particles.

15. A process as defined in claim 8, 9, or 10 wherein the oxidation in step (2) is conducted at a temperature above about 900° F.

16. A process as defined in claim 15 wherein said spent catalyst particles contain coke on the surfaces thereof in a proportion between about 0.01 and 0.15 times the weight of the catalyst particles.

17. A process as defined in claim 1, 2, 3, 4, 5, 8, 9, or 10, wherein said cobalt components on said spent catalyst particles are substantially completely in the form of sulfides.

18. A process for recovering valuable metals from spent hydroprocessing catalyst particles comprising cobalt sulfides supported on a substantial amount of porous, aluminum-containing refractory oxide, said catalyst particles containing coke on the surfaces thereof, which process comprises:

(1) contacting the catalyst particles with an aqueous sulfuric acid solution, (2) subsequently subjecting the catalyst particles to conditions of elevated temperature and an oxygen-containing oxidizing atmosphere such that essentially all the coke on the catalyst is removed therefrom, and (3) contacting the catalyst with an aqueous liquid under conditions such that cobalt in a relatively large amount and aluminum in a relatively low amount are leached from the catalyst particles into said aqueous liquid and a leachate is produced containing cobalt in a weight ratio to aluminum that is substantially higher than that of the spent catalyst particles.

19. A process as defined in claim 18 wherein said spent catalyst particles also comprise molybdenum sulfides, said refractory oxide comprises alumina, said contacting in step (2) is at a temperature above about 1000° F., said aqueous liquid in step (3) contains sulfuric acid, and said leachate also contains a substantial amount of dissolved molybdenum.

20. A process as defined in claim 18 wherein said spent catalyst particles also contain at least one sulfide of a metal selected from the group consisting of molybdenum, tungsten, and nickel, a substantial proportion of which metal is leached in step (3) into said leachate with cobalt.

* * * * *